(12) United States Patent
Fair et al.

(10) Patent No.: US 6,935,652 B2
(45) Date of Patent: Aug. 30, 2005

(54) TANDEM STROLLER WITH SIDE ENTRY AND ASSOCIATED FOLD ACTUATOR

(75) Inventors: Paul Fair, Denver, CO (US); Daniel Fox, Greenville, OH (US)

(73) Assignee: Evenflo Company, Inc., Vandalia, OH (US)

( * ) Notice: Subject to any disclaimer, the term of this patent is extended or adjusted under 35 U.S.C. 154(b) by 84 days.

(21) Appl. No.: 10/299,913

(22) Filed: Nov. 19, 2002

(65) Prior Publication Data

US 2004/0094935 A1 May 20, 2004

(51) Int. Cl.[7] .................................................. B62B 1/00
(52) U.S. Cl. ....................... 280/642; 280/647; 280/650; 280/658
(58) Field of Search ......................... 280/30, 42, 47.38, 280/47.371, 642, 643, 647, 648, 650, 658, 657; D12/128, 129

(56) References Cited

U.S. PATENT DOCUMENTS

| 152,298 | A | 6/1874 | Martienssen |
|---|---|---|---|
| 711,247 | A | 10/1902 | Evans |
| 746,189 | A | 12/1903 | Southard |
| 792,579 | A | 6/1905 | Barschow |
| 856,850 | A | 6/1907 | Dobe |
| 1,596,283 | A | 8/1926 | Mahr |
| 2,783,053 | A | 2/1957 | Sheldrick et al. |
| 3,532,356 | A | 10/1970 | Lillibridge |
| 4,365,819 | A | 12/1982 | Bart |
| 4,462,607 | A | 7/1984 | Nakao et al. |
| 4,542,915 | A | 9/1985 | Wheeler, III et al. |
| 4,620,711 | A | 11/1986 | Dick |
| 4,643,445 | A | 2/1987 | Jane Cabagnero |
| 4,660,850 | A | 4/1987 | Nakao et al. |
| 4,725,071 | A | 2/1988 | Shamie |
| 4,728,112 | A | 3/1988 | Wynens |
| 4,805,938 | A | 2/1989 | Redmond et al. |
| 4,834,415 | A | 5/1989 | Yee |
| 4,856,809 | A | 8/1989 | Kohus et al. |
| 4,858,947 | A | 8/1989 | Yee et al. |
| 4,886,289 | A | 12/1989 | Yee et al. |
| 5,018,754 | A | 5/1991 | Cheng |
| 5,033,761 | A | 7/1991 | Kelly |
| 5,050,900 | A | 9/1991 | Lee |
| D321,850 | S | * 11/1991 | Mong-Hsing ............... D12/129 |
| 5,104,134 | A | 4/1992 | Cone |
| D328,047 | S | * 7/1992 | Huang ....................... D12/129 |
| 5,167,425 | A | 12/1992 | Chen |
| 5,221,106 | A | 6/1993 | Shamie |
| 5,257,799 | A | 11/1993 | Cone et al. |
| 5,263,730 | A | 11/1993 | Roach et al. |
| 5,301,963 | A | 4/1994 | Chen |
| 5,333,893 | A | 8/1994 | Chen |
| 5,338,096 | A | 8/1994 | Huang |
| 5,375,869 | A | 12/1994 | Hsiao |
| 5,388,853 | A | 2/1995 | Lauro |
| 5,393,122 | A | 2/1995 | Andrisin, III |
| 5,417,449 | A | 5/1995 | Shamie |
| 5,417,450 | A | 5/1995 | Wang |
| 5,447,323 | A | 9/1995 | Huang |

(Continued)

FOREIGN PATENT DOCUMENTS

| EP | 1170193 | 9/2002 |
|---|---|---|
| FR | 2615155 | 5/1987 |
| GB | 2350331 | 11/2000 |

OTHER PUBLICATIONS

Photograph of prior art unit, Evenflo Company, Inc. (1996).

Primary Examiner—Hau Phan
(74) Attorney, Agent, or Firm—Taft, Stettinius & Hollister LLP

(57) ABSTRACT

A folding frame type tandem stroller includes at least one side step and a side portion of the folding frame is configured to provide a side access region to the rear seat. A canopy rod actuated locking assembly locks a stroller folding frame in an open position. A front seat tray is pivotable in two directions and a canopy rod assembly is retractable to facilitate a compact folded size of a stroller.

29 Claims, 16 Drawing Sheets

U.S. PATENT DOCUMENTS

| | | | |
|---|---|---|---|
| 5,468,009 A | 11/1995 | Eyman et al. | |
| 5,478,102 A | 12/1995 | Haung | |
| 5,482,311 A | 1/1996 | Huang | |
| 5,490,685 A | 2/1996 | Kitayama et al. | |
| D370,437 S * | 6/1996 | Siesholtz et al. | D12/129 |
| 5,522,121 A | 6/1996 | Fraynd et al. | |
| 5,622,377 A | 4/1997 | Shamie | |
| 5,653,460 A | 8/1997 | Fogarty | |
| 5,662,380 A | 9/1997 | Tam et al. | |
| 5,664,795 A | 9/1997 | Haung | |
| 5,669,624 A | 9/1997 | Eichhorn | |
| 5,687,985 A | 11/1997 | Sack | |
| 5,718,444 A | 2/1998 | Huang | |
| 5,722,682 A | 3/1998 | Wang | |
| 5,725,238 A | 3/1998 | Huang | |
| 5,741,021 A | 4/1998 | Saint et al. | |
| 5,743,671 A | 4/1998 | Williams | |
| 5,769,448 A | 6/1998 | Wang | |
| 5,772,235 A | 6/1998 | Espenshade | |
| 5,795,091 A | 8/1998 | Kakuda et al. | |
| 5,855,384 A | 1/1999 | Pike et al. | |
| 5,857,601 A | 1/1999 | Greenwood | |
| 5,865,460 A | 2/1999 | Huang | |
| 5,876,057 A | 3/1999 | Huang | |
| 5,887,935 A | 3/1999 | Sack | |
| 5,911,432 A | 6/1999 | Song | |
| 5,918,892 A | 7/1999 | Aaron et al. | |
| 6,068,284 A | 5/2000 | Kakuda | |
| 6,073,957 A | 6/2000 | Lan | |
| 6,086,087 A | 7/2000 | Yang | |
| 6,135,487 A | 10/2000 | Flannery et al. | |
| 6,152,476 A | 11/2000 | Huang | |
| 6,155,740 A | 12/2000 | Hartenstine | |
| 6,189,914 B1 | 2/2001 | Worth et al. | |
| 6,237,995 B1 | 5/2001 | Dierickx | |
| 6,241,273 B1 | 6/2001 | Gehr | |
| 6,267,406 B1 * | 7/2001 | Huang | 280/647 |
| 6,273,451 B1 | 8/2001 | Julien et al. | |
| 6,296,165 B1 | 10/2001 | Mears | |
| 6,302,412 B1 | 10/2001 | Worth et al. | |
| D450,633 S * | 11/2001 | Yang et al. | D12/129 |
| 6,361,056 B1 | 3/2002 | Chen et al. | |
| 6,390,427 B1 | 5/2002 | McConnell et al. | |
| 6,409,205 B1 | 6/2002 | Bapst et al. | |
| D465,754 S * | 11/2002 | Huang | D12/129 |
| 6,585,284 B2 * | 7/2003 | Sweeney et al. | 280/650 |

* cited by examiner

TANDEM STROLLER WITH SIDE ENTRY AND ASSOCIATED FOLD ACTUATOR

TECHNICAL FIELD

The present application relates generally to strollers, and more particularly to a fold actuator for a stroller and a tandem stroller having side entry for the rear seat.

BACKGROUND

Tandem strollers are known in the prior art. However, in the past access for a child to the rear seat of a tandem stroller has typically been impeded by some part of the stroller frame. Accordingly, it would be advantageous to provide a folding tandem stroller with one or more side steps and/or one or more side access passages to the rear seat.

In both folding tandem strollers and folding single seat strollers the mechanisms to effectuate folding are typically complex and add cost to the product. Accordingly, it would also be advantageous to provide a fold actuating arrangement that makes use of existing stroller parts.

The folded or collapsed size of a stroller is often an important design criteria from the standpoint of packaging and ease of transport for the user. This is particularly true in the case of tandem strollers. Accordingly, it would also be advantageous to provide features for reducing the collapsed size of a tandem or other stroller.

SUMMARY

In one aspect, a tandem stroller includes a frame assembly movable between an open position and a collapsed position, the fame assembly having a longitudinal axis defined from a front to a rear of the stroller when the frame assembly is in the open position, the frame assembly having a first side portion and a second side portion on opposite sides of the stroller. When the frame assembly is in the open position, the stroller includes a front seat positioned toward a front portion of the frame assembly and including a bottom portion and a back portion, and a rear seat positioned behind the front seat and including a bottom portion and a back portion. Additionally, at least one side step is located toward the frame assembly first side portion and at a longitudinal position intermediate the front seat and the rear seat, the step positioned at a height lower than the rear seat bottom portion. A step region section of the frame assembly first side portion is defined as a portion that is longitudinally aligned with the one side step, the step region section of the frame assembly is located at a height to define a substantially unobstructed side passage above the one side step for providing side access to the rear seat.

In another aspect, a tandem stroller includes a frame assembly movable between and open position and a collapsed position, the fame assembly having a longitudinal axis defined from a front to a rear of the stroller when the frame assembly is in the open position, the frame assembly having a first side portion and a second side portion laterally spaced from the first side portion. When the frame assembly is in the open position, the stroller includes a front seat positioned toward a front portion of the frame assembly and including a bottom portion and a back portion, a rear seat positioned behind the front seat and including a bottom portion and a back portion and at least one side step located at a longitudinal position intermediate the front seat and the rear seat and positioned at a height lower than the rear seat bottom portion, the one side step positioned proximate the frame assembly first side portion. The frame assembly first side portion includes at least a first tube and a second tube, the first tube extending generally horizontally in a region of the side step, the first tube extending generally upward and forward in a region forward of the side step, the first tube extending generally downward and rearward in a region rearward of the side step, the second tube extending generally horizontally in a region of the side step and adjacent the first tube, the second tube extending generally upward and forward in a region forward of the side step, the second tube extending generally upward and rearward in a region rearward of the side step In a further aspect, a tandem stroller includes a frame assembly movable between an open position for operation and a collapsed position for carrying, the fame assembly having a longitudinal axis defined from a front to a rear of the stroller when the frame assembly is in the open position, the frame assembly having a first side portion and a second side portion laterally spaced from the first side portion. When the frame assembly is in the open position, the stroller includes a front seat positioned toward a front portion of the frame assembly and including a bottom portion and a back portion, a rear seat positioned behind the front seat and including a bottom portion and a back portion and a side step to provide access to the rear seat.

In yet another aspect, a stroller includes a frame assembly movable between an open position and a collapsed position, the fame assembly having a longitudinal axis defined from a front to a rear of the stroller when the frame assembly is in the open position. At least one locking mechanism is located on the frame assembly for holding the frame assembly in the open position, the locking mechanism including a first part engaging a second part. A canopy rod has a canopy attached thereto, the canopy rod is operatively connected to the locking mechanism first part such that movement of the canopy rod effects movement of the locking mechanism first part to disengage the locking mechanism first part from the locking mechanism second part.

In a further aspect, a tandem stroller includes a frame assembly movable between an open position for use and a collapsed position for transport. A front seat is supported on the frame assembly and includes a bottom portion and a back portion. A rear seat is also supported on the frame assembly. A front canopy assembly is mounted to the back portion of the front seat and slidable therealong for movement between an upward position and a downward position, the downward position enabling reduction of a collapsed size of the stroller.

In still another aspect, a tandem stroller includes a frame assembly movable between an open position for use and a collapsed position for transport. A front seat is supported on the frame assembly and including a bottom portion and a back portion. A rear seat is also supported on the frame assembly. A front tray assembly supported on the frame assembly in front of the front seat, at least a tray portion of the tray assembly is pivotable at both first and second sides for movement between an extended position for use and a collapsed position enabling reduction of a collapsed size of the stroller.

In a further aspect, a tandem stroller includes a frame assembly movable between an open position for use and a collapsed position for transport, the frame assembly including a push handle extending to a rear portion of the stroller an including spaced apart side tubes and a connecting portion between the side tubes. A front seat is supported on the frame assembly and includes a bottom portion and a back portion, the back portion incline adjustable relative to the bottom portion. A rear seat is supported on the frame assembly and includes a bottom portion and a back portion, the rear seat back portion incline adjustable relative to the rear seat bottom portion. A cup assembly is positioned on a side tube of the push handle, the cup assembly including a mount and a cup, the mount connected to the side tube and including a coupler portion, the cup including a coupler portion configured to matingly engage the mount coupler portion so as to be removably connected thereto.

DETAILED DESCRIPTION

Figure 6:
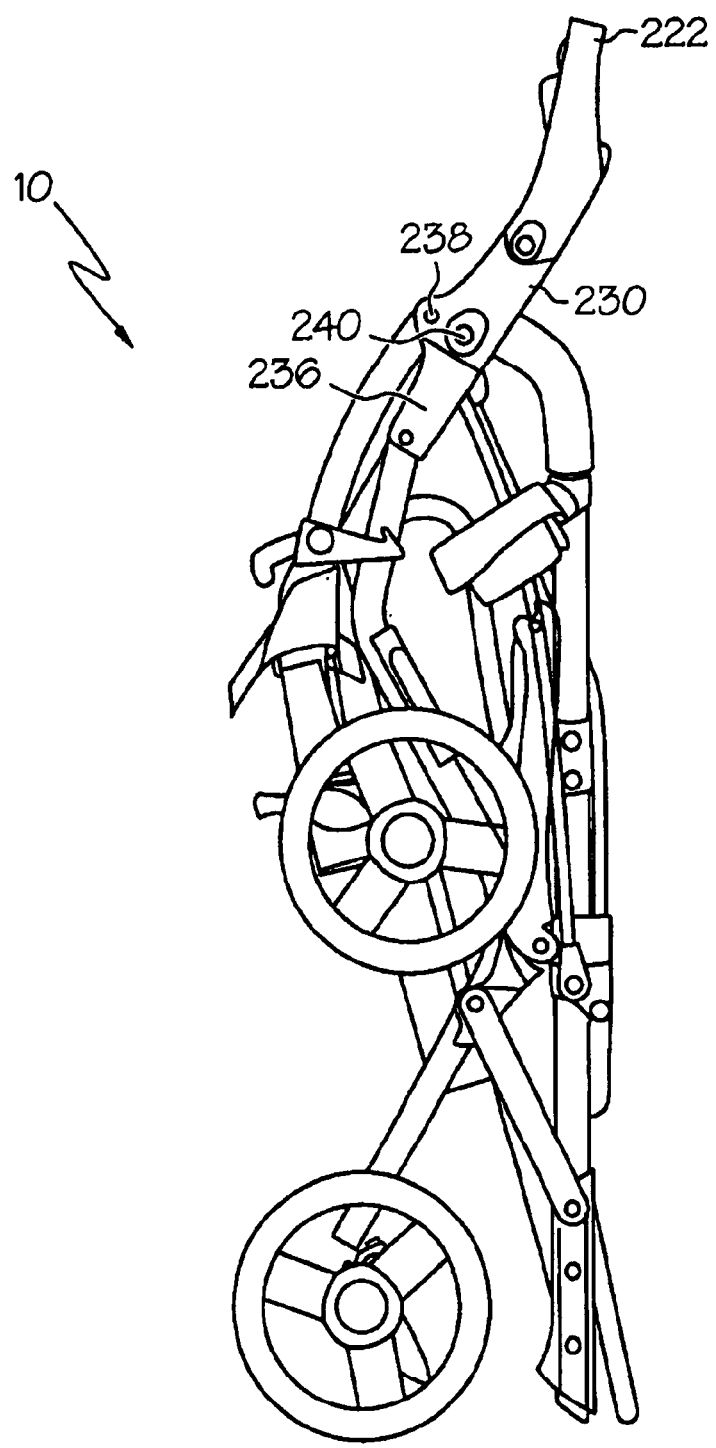
FIG. 6 is a side elevation of the tandem stroller when collapsed.

Referring to FIGS. 1–4, a tandem stroller 10 is shown and includes a frame assembly movable between an open position (e.g, FIGS. 1 and 2) for use and a collapsed position (e.g., FIG. 6) for carrying/transport when not in use. The fame assembly has a longitudinal axis 12 defined from a front 14 to a rear 16 of the stroller when the frame assembly is in the open position. The frame assembly has a side portion 18A and a side portion 18B, respectively on opposite sides of the stroller. In the illustrated embodiment, frame assembly side portion 18A includes side tubes 20A, 22A and 24A, front bracket 26A, front side tube 28A and a push handle side tube 30A. A locking mechanism 32A releasably connects the side tube 20A to the push handle side tube 30A. Wheel assembly 34A is positioned at the lower end of front side tube 28A and wheel assembly 36A is positioned at the lower end of side 20A. Similar parts are provided for frame assembly side portion 18B and need not be addressed in detail. In discussions below where reference is made specifically to one side portion of the frame assembly it should be understood that such discussion applies equally to the other side portion. A lateral tube 31 extends between side tubes 20A and 20B as shown. A rear axle 33 also extends between the rear wheel assemblies of the stroller.

Figure 2:
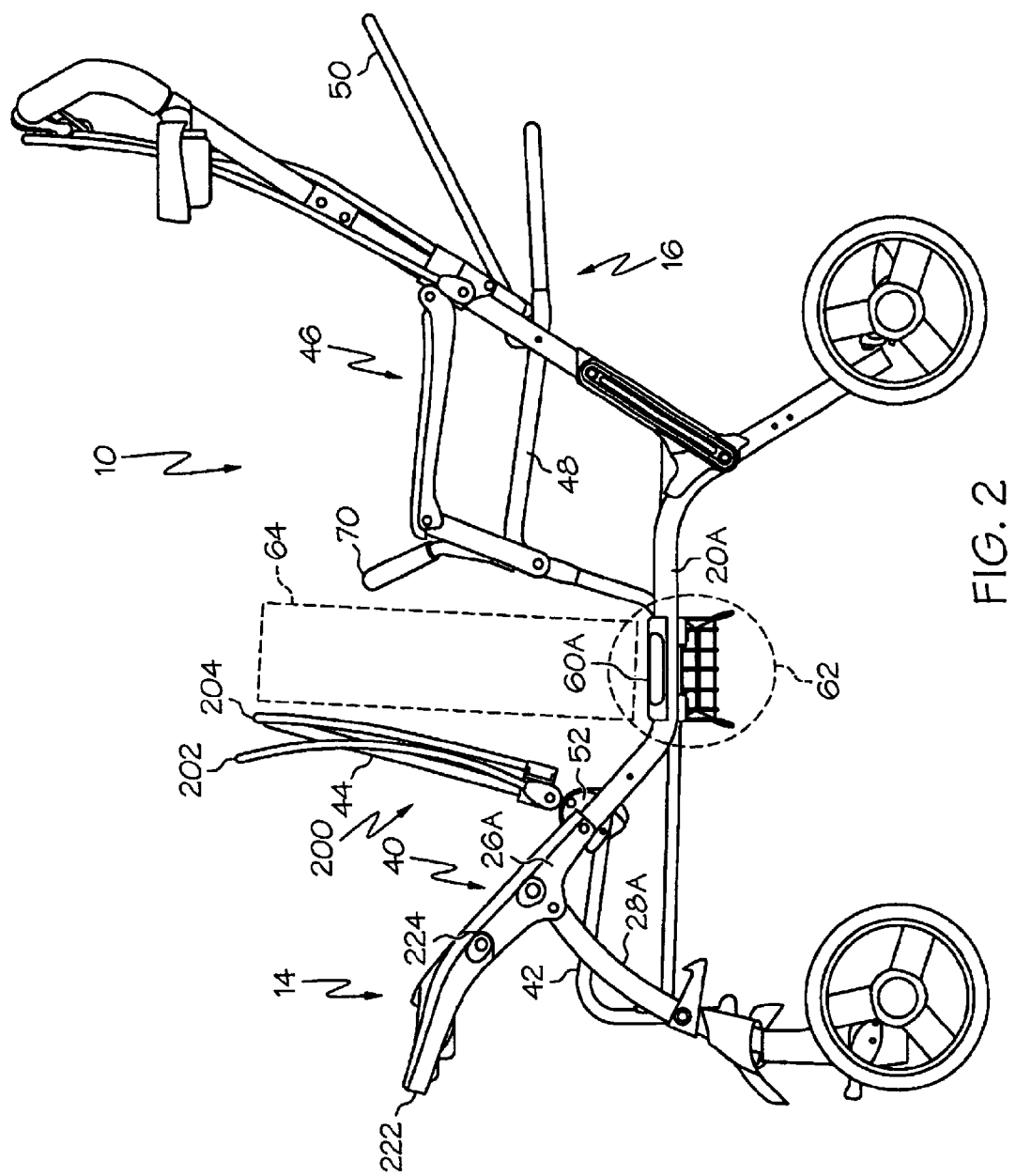
FIG. 2 is a side elevation of the tandem stroller.
Figure 3:
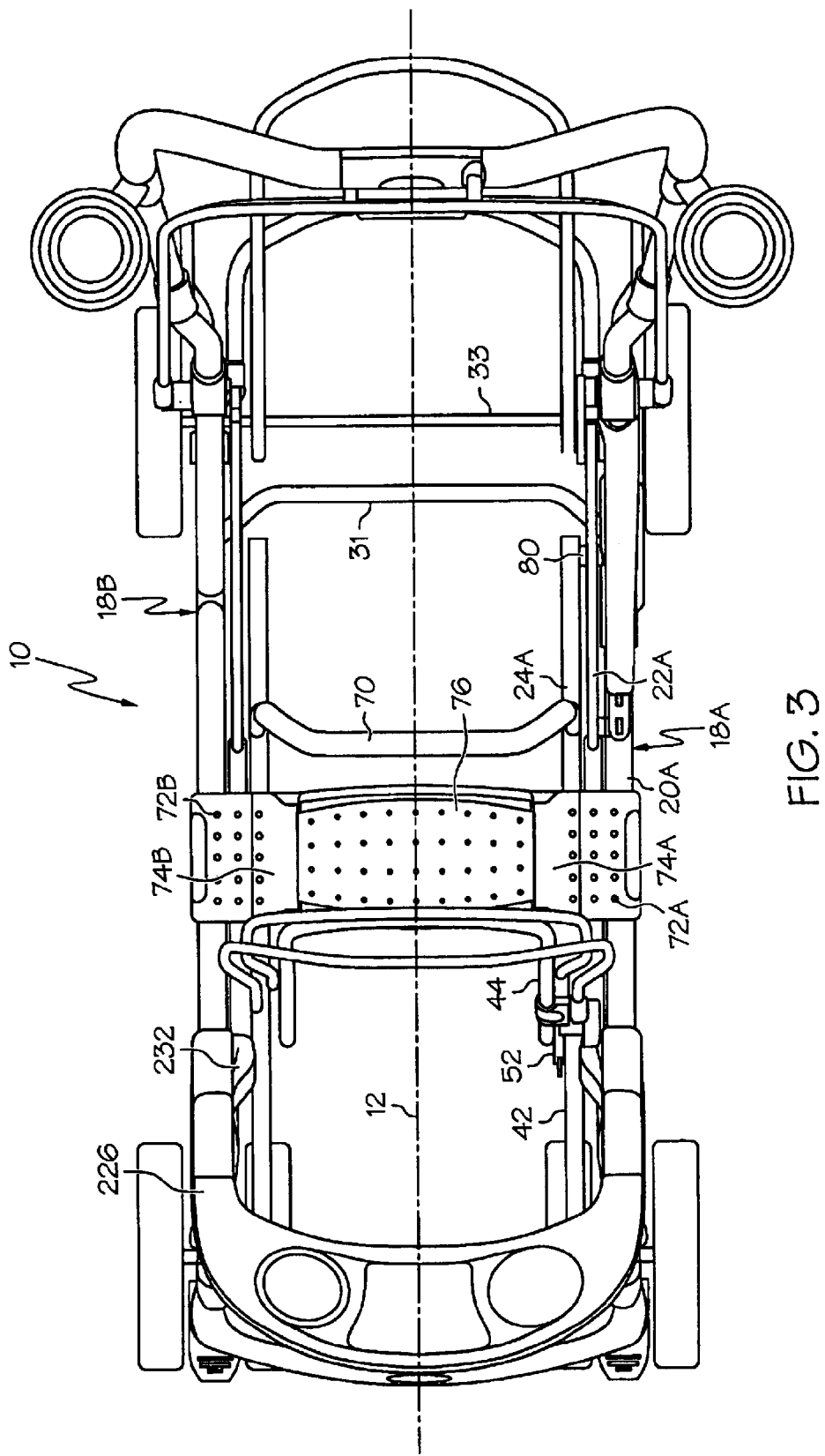
FIG. 3 is a top plan view of the tandem stroller.
Figure 4:
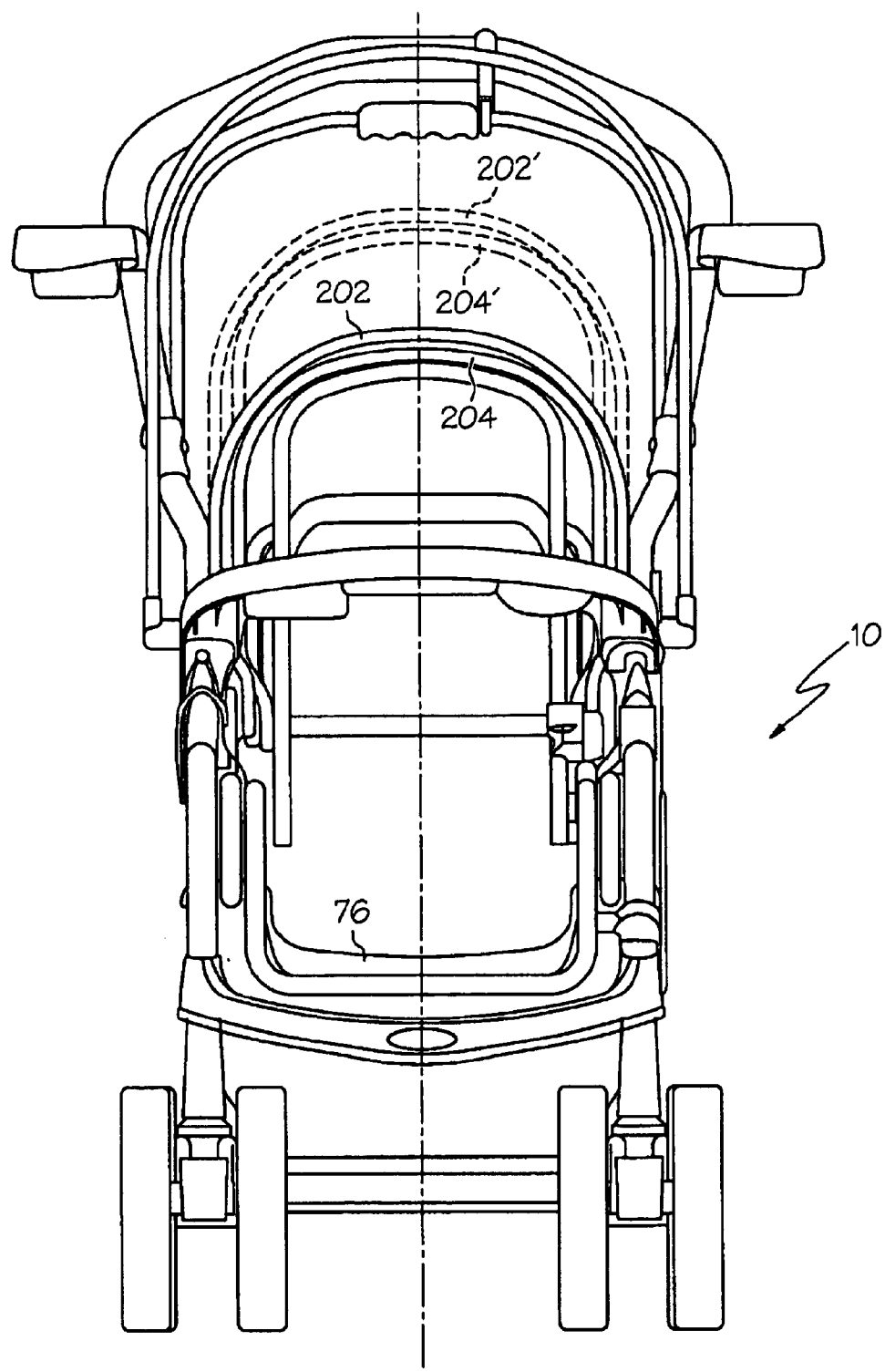
FIG. 4 is a front elevation of the tandem stroller.

As best seen in the side view of FIG. 2, when the frame assembly is in the open position, the stroller 10 includes both a front seat 40 positioned toward front portion 14 of the frame assembly and including a bottom portion 42 and a back portion 44. A rear seat 46 is positioned behind the front seat 40 and includes a bottom portion 48 and a back portion 50.

Figure 1:
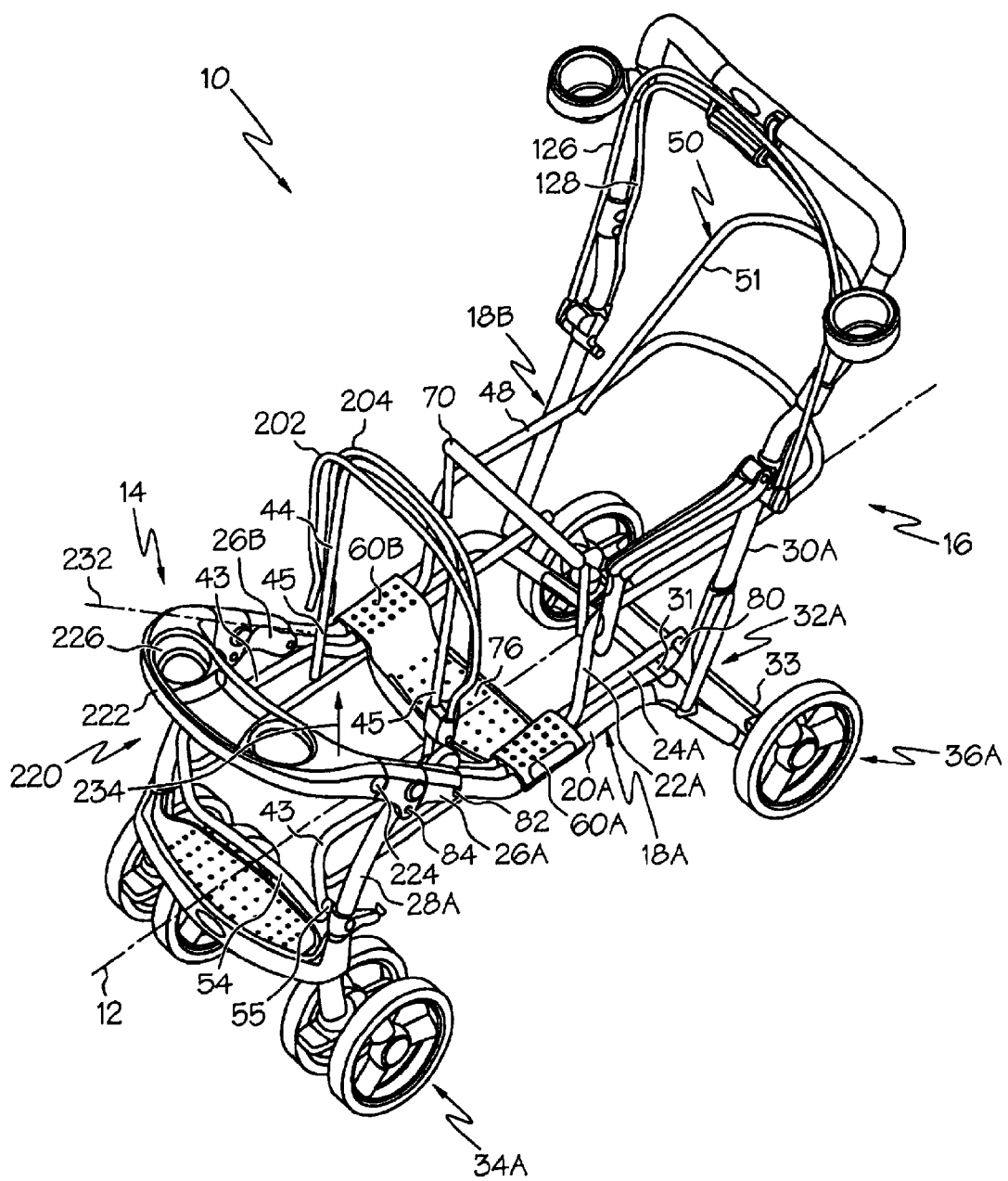
FIG. 1 is a perspective view of a tandem stroller in an open/operating position.

The front seat bottom portion 42 is formed by a tube with spaced apart tube sections 43 that extend forward from respective pivot brackets 52, and a connecting tube section that extends downward and across the front of the stroller as shown at 54 (FIG. 1). The connecting tube section 54 may be pivotally connected with front side tube 28A at point 55. The front seat back portion 44 is formed by a tube having spaced apart tube sections 45 extending upwardly from the pivot brackets, with the spaced apart tube sections connected by a central, curved tube section. The pivot brackets 52 are pivotally connected to the front brackets 26A and 26B may include suitable structure, such as a plurality of positioning slots for receiving a pin associated with the corresponding tube section of the front seat back portion 44. In this regard, each of the spaced apart tube sections 45 may be pivotally mounted to it respective bracket 52 along an adjustment slot formed in the tube section, with an internal spring mechanism biasing the pin towards the positioning slots to hold the front seat back portion 44 in position. When it is desired to adjust the recline of the front seat back portion 44, the front seat back portion 44 is pulled away from the positioning slots and the tube sections 45 move along their respective adjustment slots to disengage the pins from the positioning slots. In the illustrated embodiment, the rear seat bottom portion 48 is raised relative to the front seat bottom portion 42 and is formed by the raised and rearward extensions of side tubes 22A and 22B. The rear seat back portion 50 is formed by a tube with spaced apart tube sections 51 connected by a central, curved tube section. Pivot brackets, similar to brackets 52 described above, may be provided for enabling incline/recline adjustment of the rear seat back portion 50 relative to the rear seat bottom portion 48. In such case each pivot bracket may be pivotally connected on an inner side to both the push handle side tube and spaced apart tube section of the rear seat bottom portion 48, with each spaced apart tube section 45 of the rear seat back portion 50 pivotally connected to the bracket for incline/recline adjustment.

Side steps 60A and 60B are located toward the frame assembly side portions 18A and 18B respectfully and at longitudinal positions intermediate the front seat 40 and the rear seat 46. The steps 60A and 60B are positioned at a height lower than the rear seat bottom portion 42. A step region section 62 of each frame assembly side portion 18A and 18B is defined as a portion that is longitudinally aligned with the its respective side step 60A and 60B, and each step region section 62 is located at a height to define a substantially unobstructed side passage 64 above the respective side step 60A and 60B for providing side access (e.g., ingress and egress by a child) to the rear seat 46. Each side passage 64 is substantially unobstructed at least when the front seat back portion 44 is in one or more of its most upright (e.g., non-reclined) positions. Notably, tube 70 shown in an upright, bassinet position is pivotally connected to an upper part of each side tube 22A and 22b and would normally be pivoted downward for use with older babies/toddlers so as to be out of the way of the rear seat 46 enabling the aforementioned access to the rear seat via the side passages 64.

Figure 5:
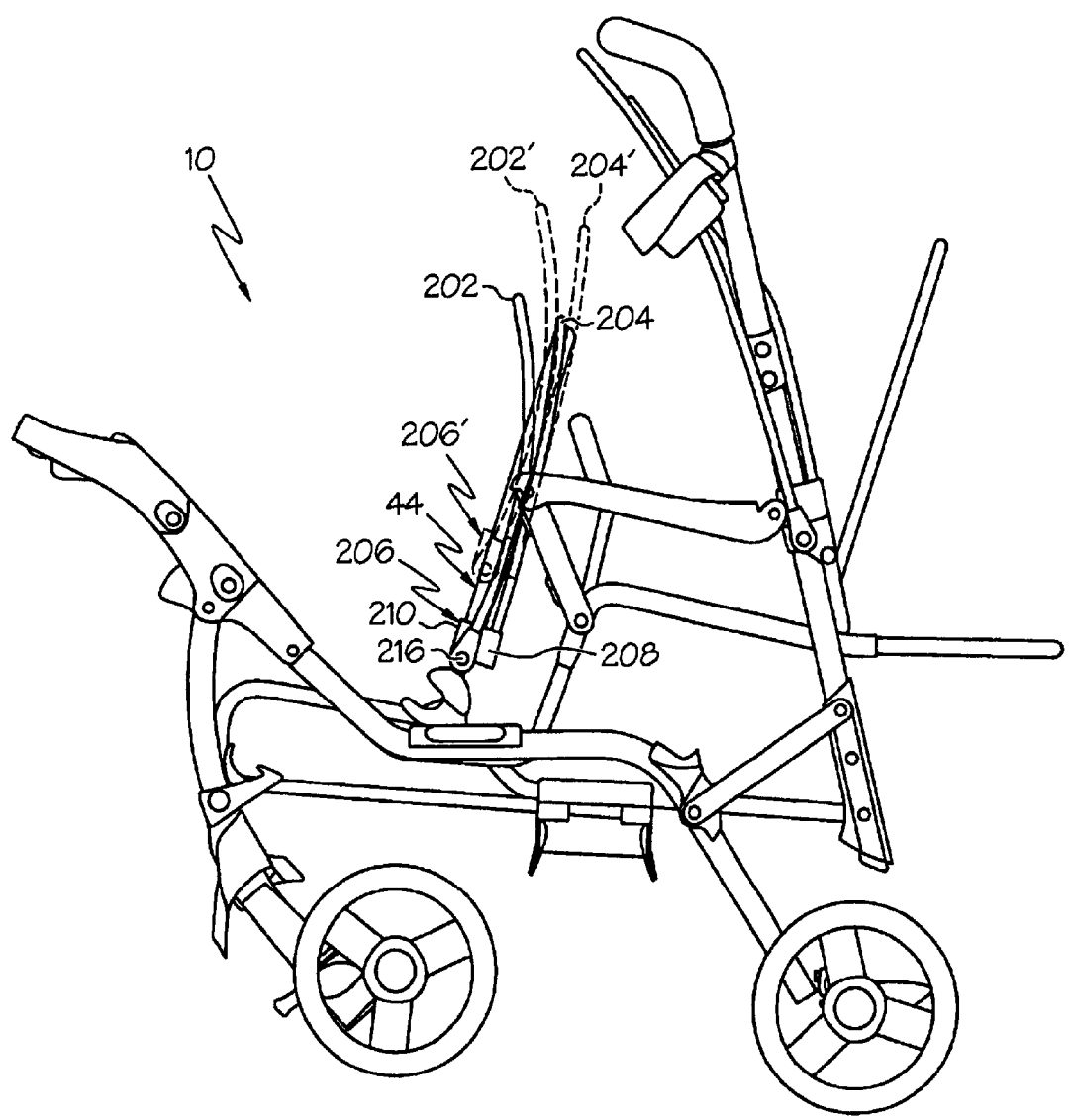
FIG. 5 is a side elevation of the tandem stroller in a partially collapse/closed position.

In the illustrated embodiment each side step 60A and 60B is formed in part by a respective exterior platform member 72A, 72B that extends over adjacent portions of side tubes 20A and 22A. Each exterior platform member 72A, 72B may be formed of plastic and may be rigidly connected to the outer side tube 20A, 20B, while some relative movement between the side tubes 22A, 22B and exterior platform members 72A, 72B may occur as the stroller is folded to its collapsed position. Each side step 60A and 60B is further formed by a respective interior platform member 74A, 74B that extends over a respective section of interior side tube 24A, 24B. Interior platform members 74A, 74B align vertically and horizontally with respective platform members 72A, 72B when the stroller is in its open position, but members 74A, 74B move away from members 72A, 72B when the stroller is moved to its collapsed position as demonstrated in partially collapsed side view of FIG. 5. The step region section of side tube 24A also moves away from the step region section of tubes 22A and 22B when the stroller is collapsed. Interior platform members 74A and 74B may be formed unitary with each other, being connected by a central step part 76 that is lower than the side steps 60A, 60B.

The underside of the step region section of tube 22A may include one or more downwardly extending fasteners with enlarged heads while the underside of the step region section of tube 24A is provided with a bracket that extends laterally therefrom for positioning beneath the step region section of tube 22A when the stroller is in the open position. The bracket may include a number of slots therein for aligning with and receiving respective enlarged heads of the fasteners of tube 22A. The slots may be formed with a large portion and a narrow portion, with the large portion sized to received the enlarged fastener head and the narrow portion smaller than the enlarged fastener head. When the stroller is moved from the closed position to the open position the large portion of each slot automatically aligns with a respective enlarged fastener head, the head moves into the slot and then the head travels along the slot to the narrow portion of the slot, thereby limiting the range of movement of the frame assembly from the closed position to the open position. The reverse occurs when the stroller is moved from the open position to the collapsed position. To facilitate movement of the frame assembly between the open and closed positions, side tube 24A is pivotally connected to side tube 30A or locking mechanism 32A at point 80, while its opposite end is connected to bracket 52. Side tubes 20A and 22A are pivotally connected to front bracket 26A at point 82. Front tube 28A is pivotally connected to front bracket 26A at point 84. Similar connections are provided on side portion 18B of the frame assembly.

Each side step 60A, 60B may be located about 12 to 16 inches off of the ground when the stroller is in the open position, and preferably no more than 18 inches off the ground when the stroller 10 is in the open position, to facilitate small children placing one foot on the step when accessing the rear seat 46. Further, each side step may be located about 4 to 8 inches lower than the rear seat bottom, and preferably no more than 10 inches lower than the rear seat bottom to facilitate a child climbing from the side step into the rear seat. In the illustrated embodiment the obstruction free side passage is achieved by configuring tubes 20A, 20B and 20C as follows. Side tube 20A extends generally horizontally in the step region section 62, extends generally upward and forward in a region forward of the step region section 62 and extends generally downward and rearward in a region rearward of the step region section 62. Side tube 22A extends generally horizontally in the step region section 62 and adjacent tube 20A, extends generally upward and forward in a region forward of the step region section 62 and extends generally upward and rearward in a region rearward of the step region section 62. Side tube 24A extends generally horizontally in both the step region section 62 and a region rearward thereof, and extends generally upward and forward in a region forward of the step region section 62.

While the illustrated embodiment provides the platform members 72A, 74A over the step region sections of the side tubes 20A, 20B and 20C to form the side steps, it is recognized that the tube sections could be uncovered and the side steps formed by the upper parts of the tube sections. Further, in the illustrated embodiment all portions of the side tubes 20A, 20B, 20C are located below the side step 60A, but it is recognized that the side steps could also be provided on the exterior side of each side tube 20A, 20B and that in such cases the side tubes might be positioned slightly above the side steps. However, in such cases it will be preferred that the portions of the side tubes, as well as other portions of the frame assembly side portions, in the step region section 62 should be located at least 3 inches below the rear seat bottom portion 48, and more preferably at least five inches below the rear seat bottom portion to provide an unobstructed side access passage to the rear seat.

Referring now primarily to FIGS. 1 and 8–11, the locking mechanism 32A and related actuation arrangement for folding are described. The locking mechanism 32A includes a moveable part 100 and a stationary part 102, with the two parts configured such that when the moveable part 100 engages the stationary part 102 the frame assembly is prevented from moving from the open position to the closed position. In the illustrated embodiment the moveable part is formed by an elongated plunger 104 that is received within the push handle side tube 30A and the stationary part 102 is formed by a housing 106 fixed to the side tube 20A and having a plunger receiving opening 108 formed therein. A link 110 also extends between the side tube 20A or housing 106 and the push handle side tube 30A or a fixed housing 112 surrounding the push handle side tube 30A and is pivotally connected at points 114 and 116. The link 110 controls relative movement between the push handle side tube 30A and the side tube 20A, causing the plunger 104 to move into alignment with the opening 108 when the frame assembly is moved from the closed position to the open position.

Figure 8:
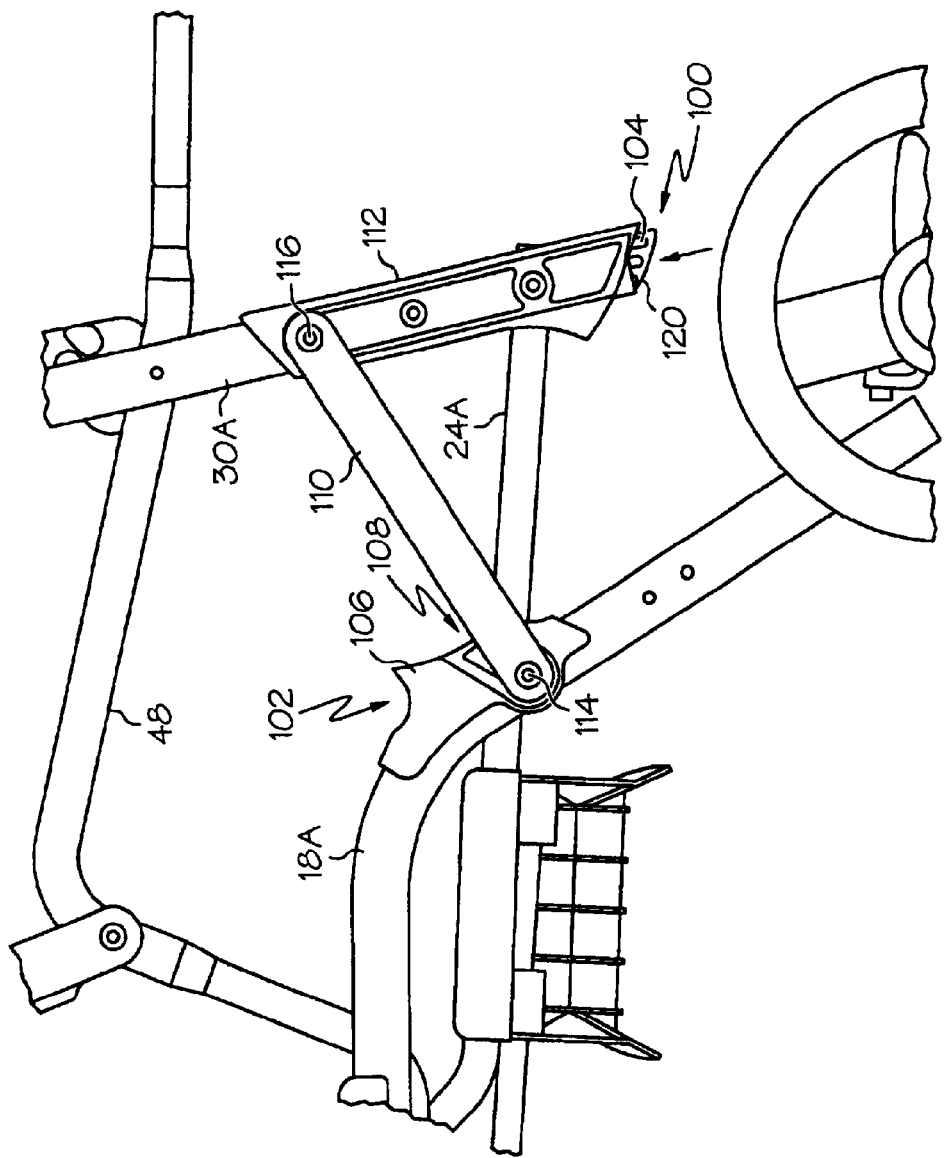
FIG. 8 is a side view of the tandem stroller locking mechanism.

In FIG. 8 the plunger 104 is shown in its extended position from the push handle side tube 30A. The plunger 104 is biased (e.g., by an internal spring) into the extended position, but is movable into the tube as shown by arrow 118. Notably, a surface portion 120 of the plunger is beveled, curved or otherwise configured to slidingly contact a portion of the housing 106 when the frame assembly is moved toward the open position, such sliding action causing the plunger to automatically move into the push handle side tube 30A. When the plunger 104 becomes aligned with the opening 108, the plunger automatically moves into the opening due to the biasing of the spring, thereby automatically locking the frame assembly in the open position. A unique actuating assembly for effecting unlocking of the mechanism 32A is described below.

Figure 11:
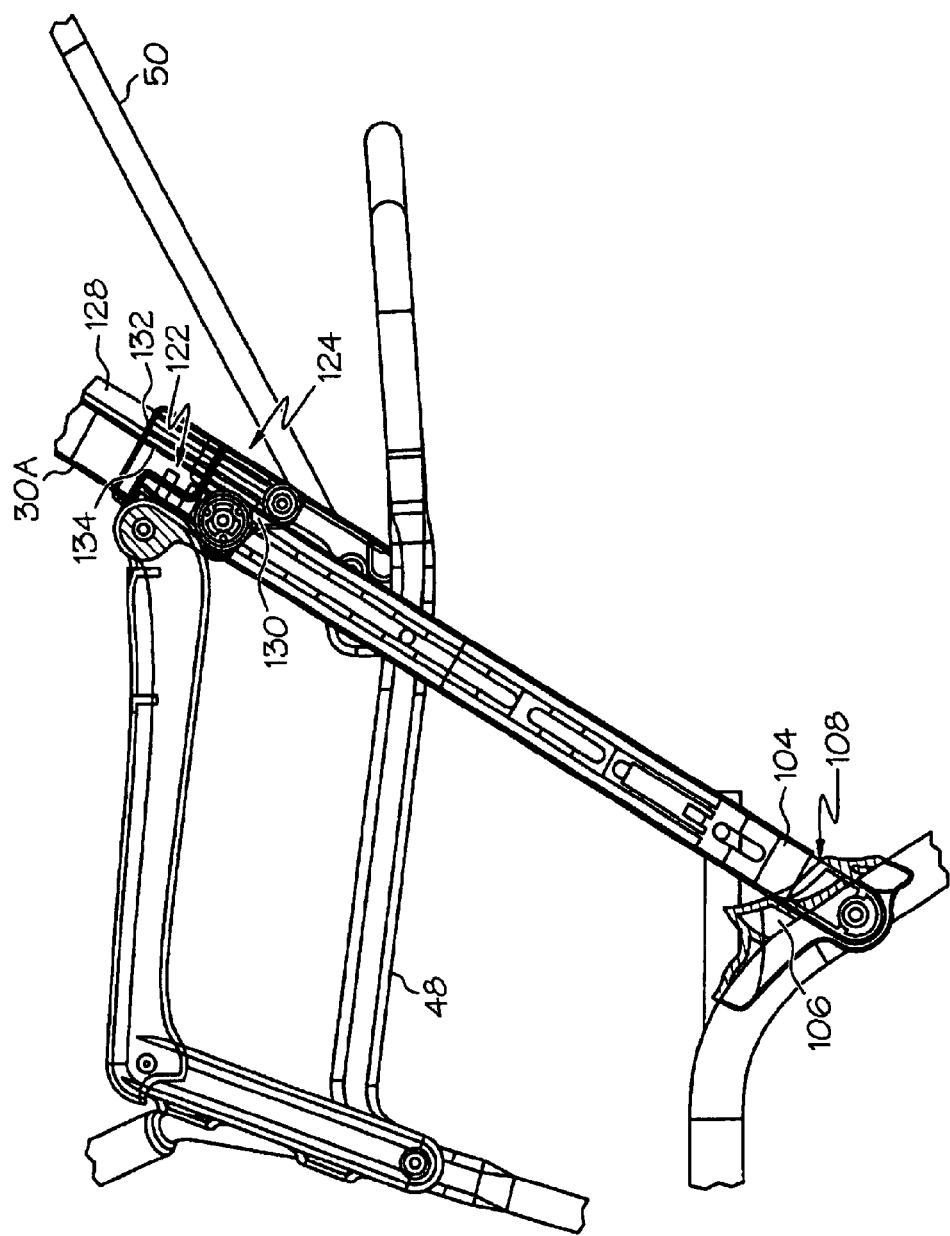
FIG. 11 is a side view of the tandem stroller locking mechanism when locked.

As best seen in FIG. 11 where a lower portion of push handle side tube 30A is cut away, the plunger 104 extends upward within the side tube to location 122 where a canopy rod collar 124 is positioned and from which a front canopy rod 126 and rear canopy rod 128 extend. A lower part 130 of the canopy rod collar is fixedly connected to the push handle side tube 30A and the front canopy rod 126 is pivotally connected to part 130. An upper part 132 of the collar 124 is slidably connected to the push handle side tube 30A and can be moved upward from the illustrated position adjacent part 130 to a position spaced from part 130. In the region of upper collar part 132 the push handle side tube includes a slot 134 extending upward along the rear side thereof. A whip or wire 136 extends from the upper collar part 132 through the slot 134 and connects to a part of the plunger 104, with the connection made anywhere below the slot 134. When the upper collar part 134 is moved (e.g., slides) upward along the push handle side tube 30A, the whip or wire acts to pull the plunger upward as needed to retract the lower part of the plunger 104 from the opening 108 so as to enable movement of the frame assembly from the open position to the closed position. Alternatively, the upper collar part 132 could include a more rigid part extending into the slot 134 for contacting an upper portion of the plunger 104. Movement of the upper collar part 132 is effected by movement of the rear canopy rod 128 as described below.

Figure 9:
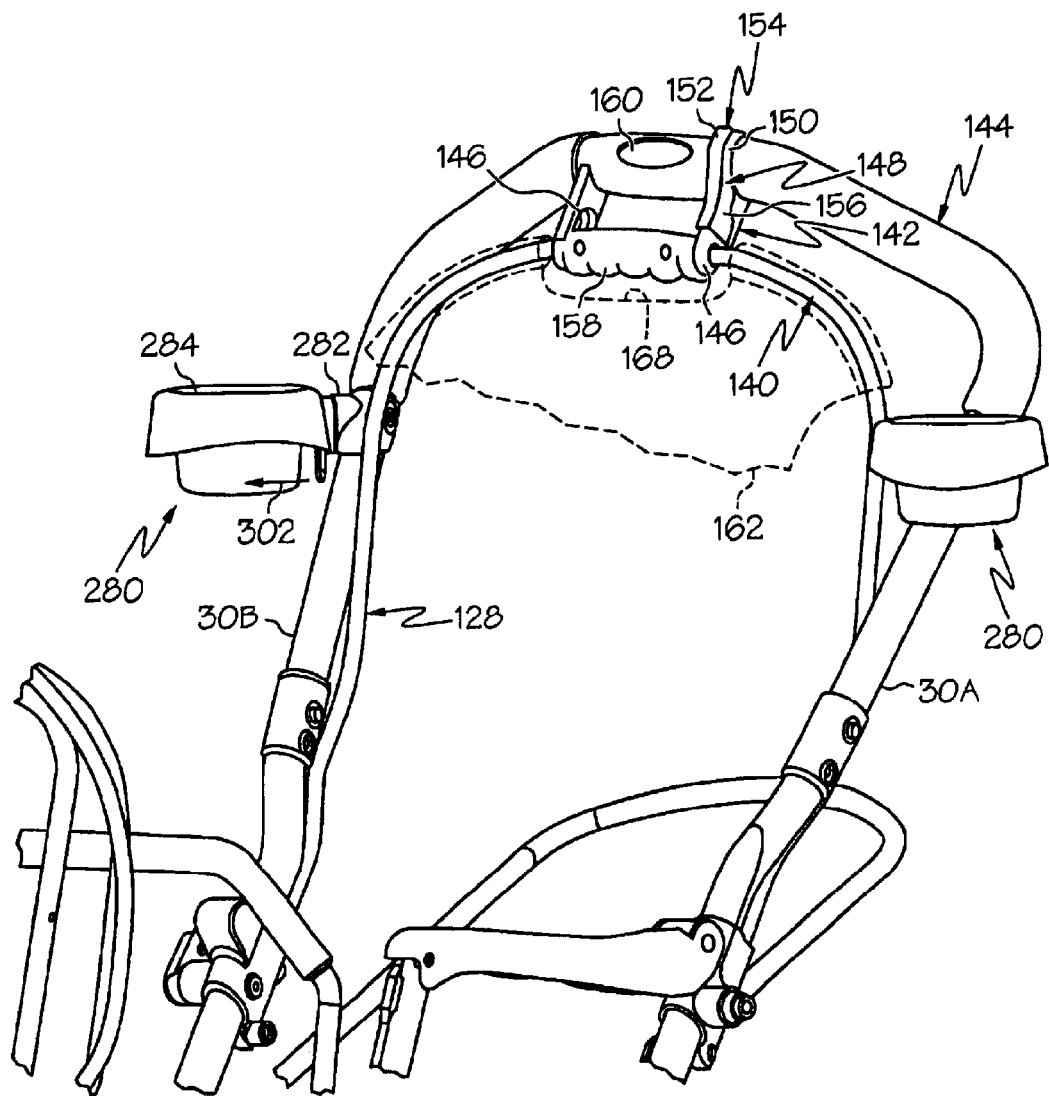
FIG. 9 is a front perspective view of the tandem stroller push handle.
Figure 10:
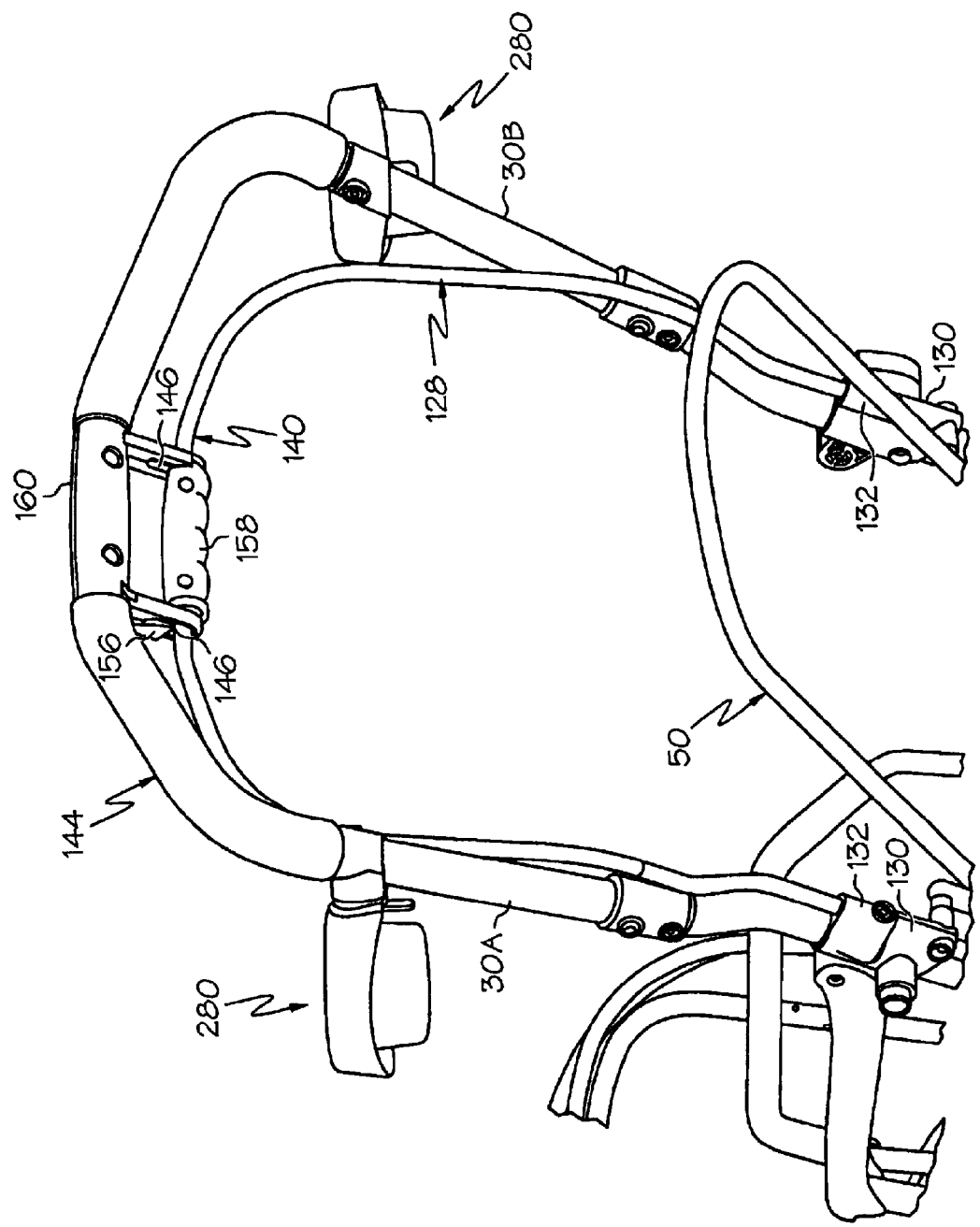
FIG. 10 is a rear perspective view of the tandem stroller push handle.

In particular, referring to FIGS. 9 and 10, the rear canopy rod 128 extends upward along the push handle side tubes 30A and 30B. A central, connecting part 140 of the rear canopy rod 128 extends through a guide frame 142 that extends from a central push handle part 144 connecting side tubes 30A and 30B. The guide frame 142 includes spaced apart and aligned slots 146 through which the canopy rod part 140 extends. A movable latch 148 has a closed positioned to block movement of the canopy rod along one slot 146 and an open position to permit movement of the canopy rod along the slot 146. In the illustrated embodiment the latch 148 is pivotally connected at point 150 and is spring biased into the illustrated closed position (FIG. 9). The latch includes an actuating surface part 152 that is pressed downward per arrow 154 to pivot latch part 156 out of the slot 146 so as to allow the rear canopy rod part 140 to be pulled upward along the slot, such upward movement of the rear canopy rod part 140 effecting a retracting movement of the plungers 104 inside tubes 30A and 30B via the structure previously described. The previously described spring-biased arrangement of the plungers 104 causes the canopy rod part 140 to move back downward along the slots 142 when the pulling action against canopy rod part 140 is released.

The canopy rod part 140 may include a hand grip 158 positioned within the guide frame 142 between the slots 146 for facilitating a user pulling the canopy rod part 140 upward along the slots 142. The latch 148 is preferably positioned to enable a user to both pivot the latch 148 (e.g., using a thumb) and pull the hand grip 158 (e.g., using the fingers of the same hand) at the same time, while the palm of the hand is placed against the center push handle part 160, which in one embodiment may be formed as a unitary part of the guide frame 142. In final construction a canopy 162 (shown in dashed line representation in FIG. 9) connects to the canopy rod part 140 on opposite sides of the guide frame 142 and extends forward to the forward canopy rod (not shown in FIG. 9). The canopy 162 is formed with a slot 164 to provide access to the hand grip 158. In the illustrated arrangement the rear canopy rod 128 remains at a relatively stationary angle, even when the seat back portion 50 is incline adjusted relative to the seat bottom portion 48.

The previously described construction provides an advantageous method of folding a stroller, including the steps of providing a frame assembly movable between an open position and a collapsed position, a seat supported on the frame assembly, the frame assembly initially in the open position; a providing a canopy rod with a canopy attached thereto, the canopy rod operatively connected to a locking mechanism for holding the frame assembly in the open position; moving the canopy rod to disengage the locking mechanism enabling the frame assembly to be moved to the collapsed position.

Figure 7:
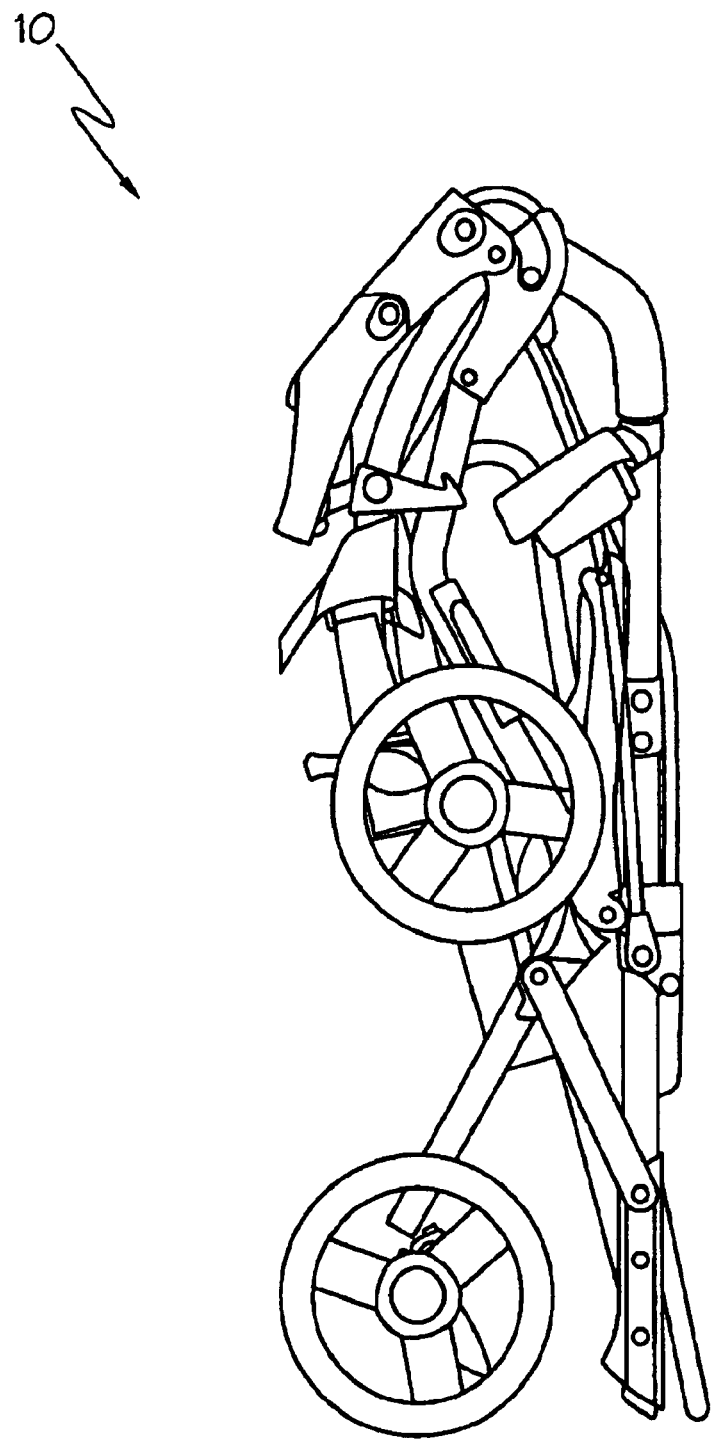
FIG. 7 is a side elevation of the tandem stroller collapsed, with front tray pivoted downward.

The illustrated stroller 10 has a compact folded size as illustrated in FIG. 7. Two advantageous feature that facilitate such a compact folded size are the incorporation of a retractable front canopy assembly and the incorporation of a pivoting front tray assembly, each of which will now be described.

Figure 12:
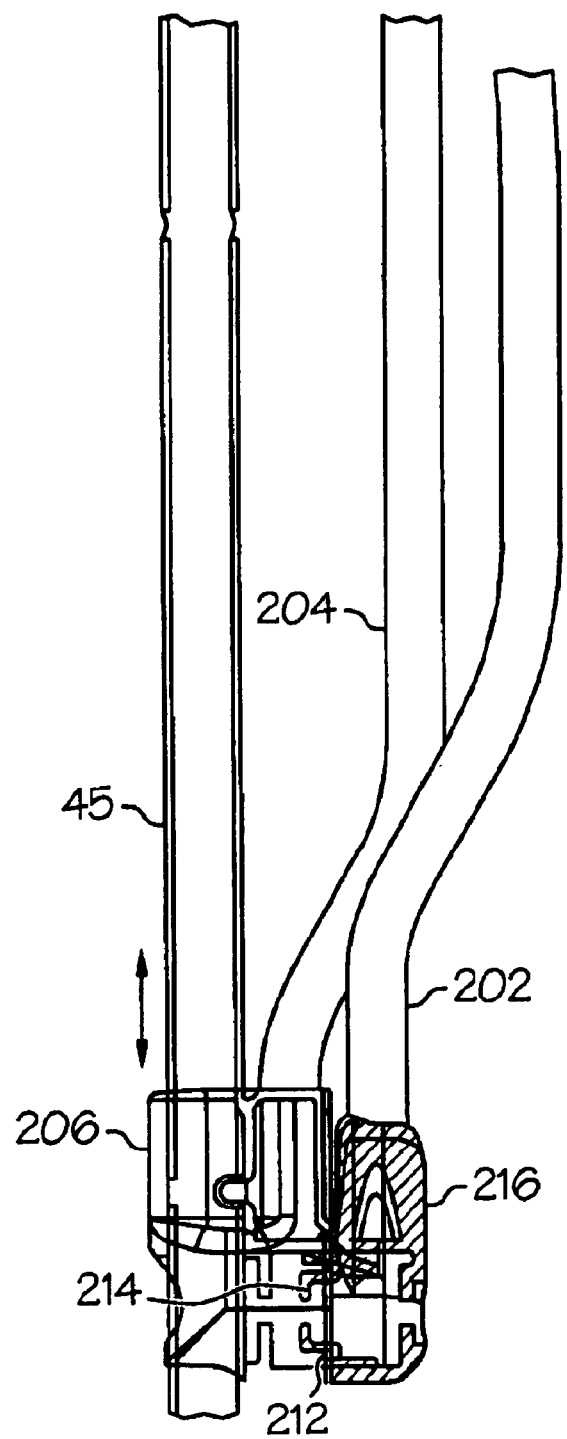
FIG. 12 is a front elevation of one side of the tandem stroller front seat canopy assembly.

Referring now primarily to FIGS. 1, 2, 4, 5 and 12, the font seat 42 includes a canopy assembly 200, including front canopy rod 202 and rear canopy rod 204. The assembly 200 is connected for movement along the front seat back portion 44 between a lowered position (shown in solid line in FIGS. 1, 2, 4 and 5) and a raised position (shown as 202', 204', 206' in dashed line in FIGS. 4 and 5). The canopy rods 202, 204 are connected to a mount housing 206 of the collar-type for sliding along the tube forming the front seat back portion 44. The rear canopy rod 204 is fixedly connected to a rearward extending part 208 of the housing 206. The front canopy rod 202 is pivotally connected to the front part 210 of the housing via a mating arrangement between a side opening 212 of part 210 and a boss or other projection 214 extending inwardly from a connecting part 216 of the front canopy rod 202, as best seen in FIG. 12. The collar-like mount housing 206 slides along the tube section 45 of the front seat back portion 44 and may have a friction fit therewith to hold the canopy assembly in the extended position. As an alternative, or in addition, the mount housing 206 may include an interior protrusion or nub that is biased toward the tube section and the tube section may include one or more openings therealong so that the protrusion or nub engages the openings when the canopy assembly is at corresponding, desired stop positions. Preferably, the canopy assembly 200 is movable between the upward, extended position and the downward position both when the frame assembly is in the open position and when the frame assembly is in the collapsed position, so as to facilitate more ease in collapsing or folding the stroller to its closed or collapsed position. Still further, the mount housings 206 on both sides of the front seat back portion 44 may be non-removable during ordinary use. By way of example, this arrangement can be achieved by having the two mount housings 206 formed with openings and sliding the mount housings 206 onto the tube sections 45 prior to attachment of the rear seat back portion 44 to the bracket 52.

Figure 13:
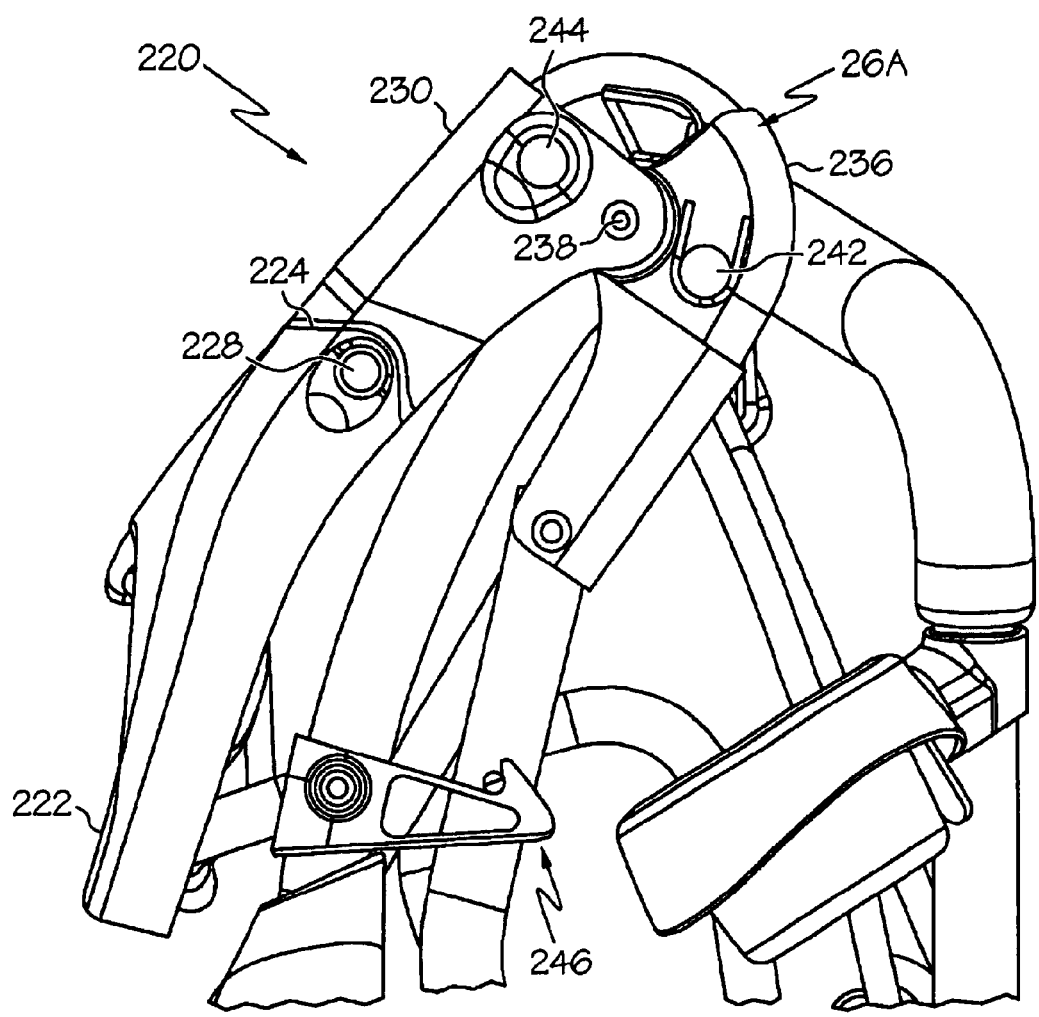
FIG. 13 is a side view of the tandem stroller front tray in its downward pivoted position.

Referring now primarily to FIGS. 1–7 and 13, a front tray assembly 220 is provided. The tray assembly includes a laterally extending tray portion 222 that releasably connects to front bracket 26A at location 224 and is pivotally/rotatably connected to front bracket 26B at location 226. A latch system 228 is provided between tray portion 222 and mount housing front part 230. When the latch system 228 is actuated the tray portion 222 can move away from front bracket 26A and be rotated laterally about an axis 232 as shown by arrow 234 to enable access to the front seat 42. A front step also extends between the sides of the stroller to facilitate access and supporting a child's feet. Importantly, in addition to the lateral pivot feature, which is know in the prior art, the tray assembly 220 is also pivotal from its extended position (e.g., FIGS. 2 and 6) to a downward, collapsed position (e.g., FIGS. 7 and 13). To achieve this motion the bracket forward part 230, which can be considered part of the tray assembly 220, is pivotally connected to a bracket rearward part 236 at location 238. In the tray extended position (FIG. 7) a latch system 240 holds bracket forward part 230 to bracket rearward part 236. When the latch system 240 is released the bracket forward part 230 can be pivoted downward to the collapsed position. The latch system 240 may be formed by an outwardly biased button 242 of bracket rearward part 236 that engages a corresponding opening 244 in bracket forward part 230. The button 242 is manually depressed through the opening 244 to release the latch. A similar latch system can be provided on both the exterior and interior sides of each of the brackets. In the illustrated tray assembly 220 the tray can be moved between the extended position and the collapsed position both when the frame assembly is in the open position and when the frame assembly is in the collapsed position. Further, the tray is movable between the extended position and the collapsed position without first being laterally pivoted. A latch mechanism 246 is also shown in FIG. 13 for holding the frame assembling the collapsed position.

Figure 14:
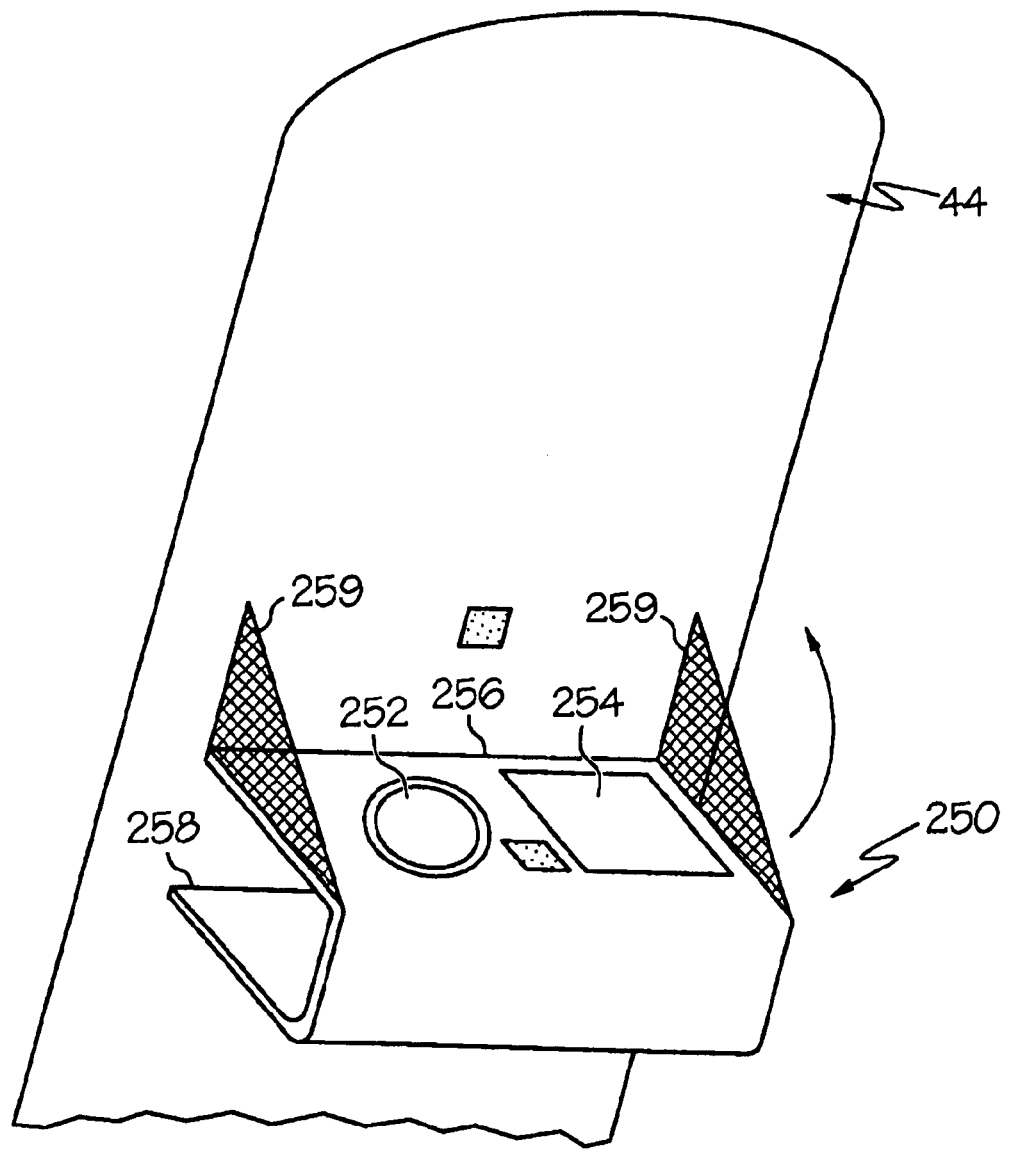
FIG. 14 is a perspective view of an accessory unit connected to the rear side of the tandem stroller front seat back portion.
Figure 15:
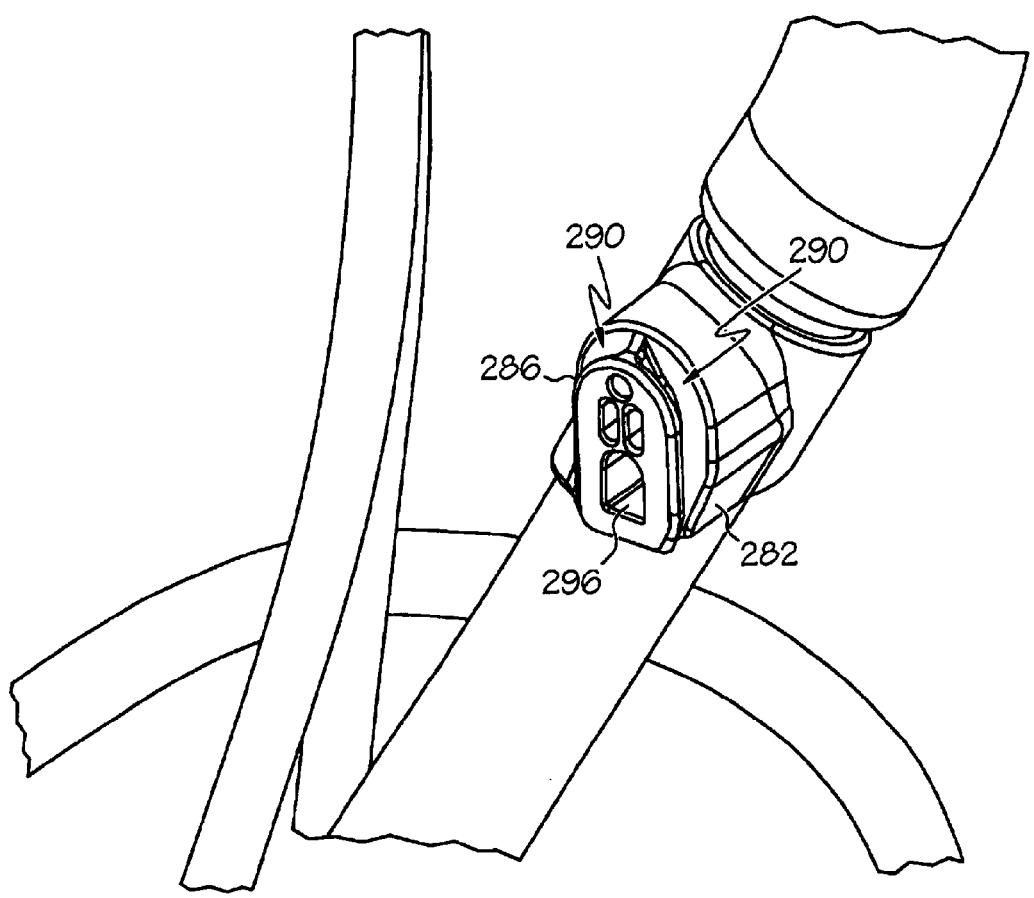
FIG. 15 is a perspective view of a cup assembly mount as attached to a push handle side tube.
Figure 16:
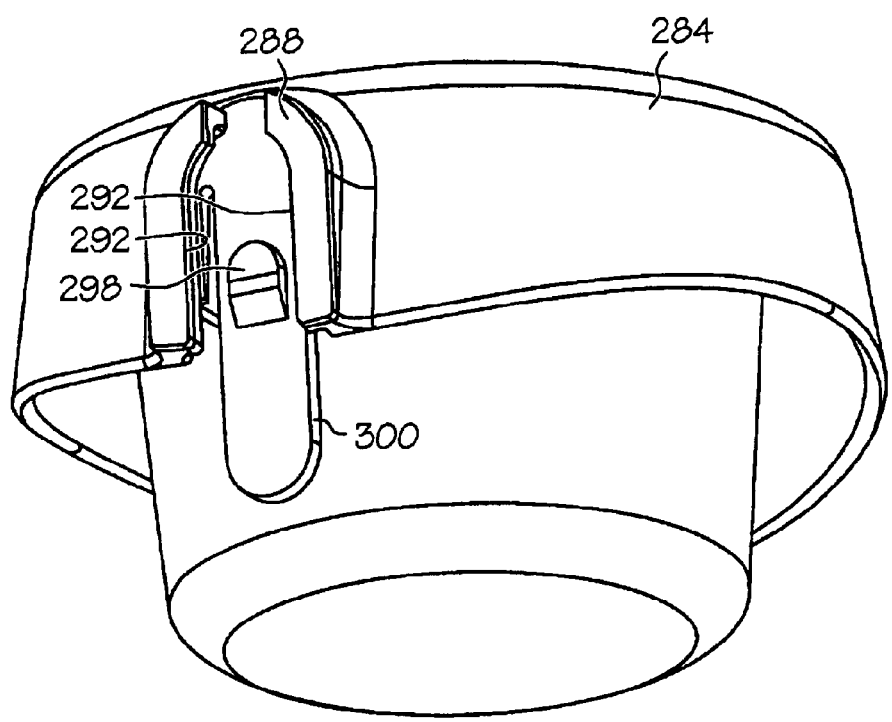
FIG. 16 is a perspective view of a cup assembly cup.

The stroller 10 may also include another advantageous feature, provided for the rear seat passenger. The front seat back portion 44 will typically include a cloth backing extending between tube sections 45 to support the back of the child. Similar cloth supports, with or without internal panel members, will be provided on the front seat bottom portion 42, rear seat bottom portion 48 and rear seat back portion 50. Referring to FIG. 14, a rear seat accessory unit 250 is provided, and may include one or more of a rear seat tray or a rear seat cupholder mounted to a rear side of the front seat back portion 44 and movable between a collapsed position against the rear side of the front seat back portion and the illustrated extended position to expose a tray surface 252 and/or a cup holder opening 254. The unit may be formed primarily or entirely of soft goods stitched to the rear side of the front seat back portion 44 at upper interface 256 and lower interface 258. The unit is supported in the extended position by spaced apart, triangular fabric swatches 259 stitched along one side to the rear seat back portion 44 and stitched along an adjacent side to the u-shaped soft goods forming the unit. Corresponding hook and latch type fastener means 260 and 262 are provided respectively on the front seat back portion 44 and the unit 252 to engage each other when the unit is pivoted upward, thereby holding the unit against the rear side of the front seat back portion 44. Buttons or ties could be provided as an alternative. The soft goods nature of the unit 252 enables it to automatically move from its extended position to its collapsed position when the frame assembly is moved from its open position to its collapsed position, such automatic movement caused by contact with other parts of the stroller.

As best seen in FIGS. 9–10 and 15–16, a cup assembly 280 may be provided on each push handle side tube 30A, 30B. Each cup assembly 280 includes a mount 282 and a cup 284. The mount 282 is connected to the push handle side tube and includes a coupler portion 286. The cup 284 includes a coupler portion 288 configured to matingly engage the mount coupler portion 286 so as to be removably connected thereto. In the illustrated embodiment coupler portion 286 is formed by an extending part that forms slots or grooves 290 and the coupler portion 288 is formed by an extending part that forms flanges 292, with the flanges 292 slidingly received in the slots 290. Coupler portion 286 also includes a detent or recess 296 for receiving a protrusion 298 on a flexible finger element 300 of the coupler portion 288. The protrusion 298 is ramped to effect deflection of the finger element 300 when the coupler portion 288 slides onto the coupler portion 286. To remove the cup 284 the finger element 300 is pressed toward the cup as indicated by arrow 302 of FIG. 9. Both cups are positioned toward an outer side of the respective push handle side tubes 30A, 30B to facilitate movement of the frame assembly to the collapsed position. Each cup 284 is also removable its mount 282 both when the stroller is in the open position and when the stroller is in the collapsed position.

It is to be clearly understood that the above description is intended by way of illustration and example only and is not intended to be taken by way of limitation. Other changes and modifications could be made, including both narrowing and broadening variations and modifications of the appended claims.

What is claimed is:

1. A tandem stroller, comprising:
  a frame assembly movable between an open position and a collapsed position, the fame miserably having a longitudinal axis defined from a front to a rear of the stroller when the frame assembly is in the open position, the frame assembly having a first side portion and a second side portion on opposite sides of the stroller;
  when the frame assembly is in the open position, the stroller includes:
  a front seat positioned toward a front portion of the frame assembly and including a bottom portion and a back portion;
  a rear seat positioned behind the front seat and including a bottom portion and a back portion; and
  at least one generally horizontally extending side step located toward the frame assembly first side portion and at a longitudinal position immediate the front seat and the rear seat, the step positioned at a height lower than the rear seat bottom portion, a step region section of the frame assembly first side portion defined as a portion that is longitudinally aligned with the one side step, the frame assembly providing a side passage above the one side step for providing side access to the rear seat said side passage being completely void of obstruction.

2. The tandem stroller of claim 1, wherein, when the frame assembly is in the open position:
  the height of the frame assembly first side portion in the step region is below the side step.

3. The tandem stroller of claim 1, wherein when the frame assembly is in the open position:
  the rear seat bottom portion is elevated relative to the front seat bottom portion, and the height of the step region section is below the front seat bottom.

4. The tandem stroller of claim 1, wherein, when the frame assembly is in the open position:
  the height of the frame assembly first side portion in the step region is at least three inches below the rear seat bottom portion.

5. The tandem stroller of claim 1, wherein, when the frame assembly is in the open position:
  the side step is positioned over at least first and second laterally adjacent tube sections of the step region section, the first tube section moving relative to the second tube section when the frame assembly is moved to the closed position.

6. The tandem stroller of claim 1 wherein the side step is defined by a platform member extending over at least first and second laterally adjacent tube sections of the step region section.

7. The tandem stroller of claim 1 wherein the side step is defined by at least first and second laterally adjacent tube sections of the step region section.

8. The tandem stroller of claim 1 wherein the side step comprises a first side step, the stroller further comprising:
a second side step located toward the name assembly second side portion and at a longitudinal position intermediate the front seat and the rear seat, the second side step positioned at a height lower than the rear seat bottom portion, a step region section of the frame assembly second side portion defined as a portion that is longitudinally aligned with the second side step, the step region section of the frame assembly second side portion being located at a height to define a substantially unobstructed second side passage above the second side step for providing second side access to the rear seat.

9. The tandem stroller of claim 8 wherein, when the frame assembly is in the open position, the height of the first side step is the same as the height of the second side step.

10. The tandem stroller of claim 8 wherein, when the frame assembly is in the open position, a middle step portion extends between the first side step and the second side step.

11. The tandem stroller of claim 10 wherein, when the frame assembly is in the open position, the middle step portion is at a lower height than the first and second side steps.

12. The tandem stroller of claim 1 wherein, when the frame assembly is in the open position, the front seat back is incline adjustable relative to the front seat bottom and the rear seat back is incline adjustable relative to the rear seat bottom.

13. A tandem stroller, comprising:
a frame assembly movable between an open position and a collapsed position, the frame assembly having a longitudinal axis defined from a front to a rear of the stroller when the frame assembly is in the open position, the frame assembly having a first side portion and a second side portion on opposite sides of the stroller;
when she frame assembly is in the open position, the stroller includes:
a front seat positioned toward a front portion of the frame assembly and including a bottom portion and a back portion;
a rear seat positioned behind the front seat and including a bottom portion and a back portion; and
at least one side step located toward the frame assembly first side portion and at a longitudinal position intermediate the front seat and the rear seat, the side step positioned lower than the rear seat bottom portion, the side step including a step platform positioned over at least first and second longitudinally extending tube sections of the frame assembly first side portion.

14. The tandem stroller of claim 13 wherein the first tube section moves relative to the second tube section when the frame assembly is moved to the closed position.

15. The tandem stroller of claim 13, wherein, when the frame assembly is in the open position, the step platform is formed by at least first and second aligned step platform portions.

16. The tandem stroller of claim 15 wherein the first step platform portion moves relative to the second step platform portion when the frame assembly is moved to the closed portion.

17. The tandem stroller of claim 13 wherein, when the frame assembly is in the open position, the step platform is further positioned over a third tube section that extends longitudinally adjacent one or both of the first and second tube sections.

18. A tandem stroller, comprising:
a frame assembly movable between and open position and a collapsed position, the frame assembly having a longitudinal axis defined from a front to a rear of the stroller when the frame assembly is in the open position, the frame assembly having a first side portion and a second side portion laterally spaced from the first side portion;
when the frame assembly is in the open position, the stroller includes:
a front seat positioned toward a front portion of the frame assembly and including a bottom portion and a back portion;
a rear seat positioned behind the front seat and including a bottom portion and a back portion; and
at least one side step located at a longitudinal position intermediate the front seat and the rear seat and positioned at a height lower than the rear seat bottom portion, the one side step positioned proximate the frame assembly first side portion;
wherein the frame assembly first side portion includes at least a first tube and a second tube, the first tube extending generally horizontally in a region of the side step, the first tube extending generally upward and forward in a region forward of the side step, the first tube extending generally downward and rearward in a region rearward of the side step, the second tube extending generally horizontally in a region of the side step and adjacent the first tube, the second tube extending generally upward and forward in a region forward of the side step, the second tube extending generally upward and rearward in a region rearward of the side step.

19. The tandem stroller of claim 18, wherein the frame assembly first side portion further includes a third tube, the third tube extending generally horizontally in both a region of the side step and a region rearward of the side step, the third tube extending generally upward and forward in a region forward of the side step.

20. A tandem stroller, comprising:
a frame assembly movable between an open position for operation and a collapsed position for carrying, the frame assembly having a longitudinal axis defined from a front to a rear of the stroller when the frame assembly is in the open position, the frame assembly having a first side portion and a second side portion laterally spaced from the first side portion:
when the frame assembly is in the open position, the stroller includes;
a front seat positioned toward a front portion of the frame assembly and including a bottom portion and a back portion;
a rear seat positioned behind the front seat and including a bottom portion and a back portion; and
at least one generally horizontally extending side step located at a longitudinal position intermediate the front seat and the rear seat, said frame assembly providing side passage above the side step for providing said side passage being completely void of obstruction side access to the rear seat.

21. The tandem stroller of claim 20 wherein the side step is located at a height no more than 18 inches above ground level when the stroller is in the open position.

22. The tandem stroller of claim 20 wherein the side step height is between 12 inches and 16 inches above ground level when the stroller is in the open position.

23. The tandem stroller of claim 20 wherein the side step is located at a height that is no more than 10 inches below a height of the rear seat bottom portion.

24. The tandem stroller of claim 23 wherein the side step height is between about 4 inches and 8 inches below the height of the rear seat bottom portion.

25. The tandem stroller of claim 23 wherein the side step is formed by a step platform positioned atop at least one side tube.

26. The tandem stroller of claim 25 wherein the step platform is also positioned atop both first and second side tubes.

27. The tandem stroller of claim 20 wherein, when the frame assembly is in the open position, all portions of the frame assembly first side portion in an access region between the front seat and the rear seat are positioned at least three inches below the rear seat bottom portion to provide an unobstructed first side access passage to the rear seat.

28. The tandem stroller of claim 27 wherein, when the frame assembly is in the open position all portions of the frame assembly second side portion in the access region between the front seat and the rear seat are positioned at least three inches below the rear seat bottom portion to provide an unobstructed second side access passage to the rear seat.

29. The tandem stroller of claim 20 wherein, when the frame assembly is in the open position all portions of the frame assembly first side portion in the access region between the front seat and the rear seat are positioned at least five inches below the rear seat bottom portion to provide the unobstructed first side access passage to the rear seat.

* * * * *